April 18, 1950     E. E. MURPHY ET AL     2,504,569
COUPLING

Filed July 31, 1948

INVENTORS.
E. E. MURPHY
R. A. BURKHART
by Sheridan, Davis & Cargill
Attorneys

Patented Apr. 18, 1950

2,504,569

UNITED STATES PATENT OFFICE 2,504,569

COUPLING

Eugene E. Murphy, Omaha, Nebr., and Robert A. Burkhart, Los Angeles, Calif.

Application July 31, 1948, Serial No. 41,878

8 Claims. (Cl. 284—18)

This invention relates in general to couplings, and more particularly to quickly detachable couplings for connecting conduits for fluid under pressure.

In many fields of use employing either liquid or gaseous fluid, such as refrigeration apparatus, it is necessary on occasion to remove some part of the mechanism from the system for repair or replacement. This requires disconnection therefrom of the associated fluid conduit, which either necessitates prior removal of the fluid from the system, or results in loss of part or all of the fluid. And upon subsequent replacement of the mechanism removed, the re-introduction of fluid to the system consumes considerable time, or the addition of substitute fluid for that lost entails the undesirable entrapment of air in the system. For example, in an air-conditioning system on a railroad passenger train, if the compressor must be replaced or removed for repair, it is necessary first to "pump down" the system, i. e., to remove all of the refrigerant fluid therefrom, and such procedure requires approximately three hours to accomplish. After replacement of the compressor, the reverse process of introducing refrigerant fluid to the system requires similar time and effort. For these reasons, and because of the many other difficulties encountered if valuable or poisonous liquid or gas is involved, a reliable, self-sealing, detachable coupling is of utmost importance.

A principal object of this invention, therefore, is the provision of a quickly detachable coupling for connecting the ends of the conduits when disconnected by virtue of valves disposed in each of the separable male and female members comprising the coupling, the valves having contacting relationship with each other during connection of the coupling so as to be opened when the coupling is made to permit the free flow of fluid therethrough.

Another important object of the invention is the provision of a gasket for sealing such a coupling against leakage between the male and female members which is effective to so function during connection of the coupling and before opening of the valves resulting from such connection.

A further object of the invention is to provide such a coupling in which the movable portions of the two valves are interchangeable so as to facilitate manufacture of the coupling, and in which both the stationary and movable portions of the valves are readily removable for purposes of repair and replacement.

Another object of the invention is the provision of such a coupling which has relatively small outer dimensions while presenting a fluid passage therethrough, when the coupling is made, which is greater in cross-sectional area than the conduits connected thereby.

A further important object of the invention is to provide means for automatically exhausting any fluid entrapped within the coupling between the valves, after closing of the valves during disconnection of the coupling and before complete separation of the male and female members, so as to prevent an explosive or otherwise harmful separating force being applied by such entrapped fluid, when under a high pressure, against the separable members of the coupling as disconnection is completed.

This feature is of particular importance where the coupling is employed in a system in which fluid under high pressure is used, since the fluid entrapped in the central part of the coupling otherwise may explosively separate the coupling at the instant of final disconnection thereof and cause serious injury to the person disconnecting it. The example previously given of an air conditioning system on a railroad train is illustrative of such a potentially dangerous setting, since refrigerant fluid pressures of 300 pounds per sq. in. commonly are employed therein.

Another object of the invention is to accomplish such automatic discharge of the entrapped fluid restrictively during disconnection of the coupling by the provision of a bleeder aperture in the wall of the female coupling member which is so positioned as to be cleared by the sealing gasket only after the valves are closed and before complete disconnection of the coupling.

A further object is to prevent clogging of this bleeder aperture by foreign material when the coupling is made by extending the aperture through external threads that are provided on the female member for engagement with a connecting nut, so that the latter will close the outer end of the bleeder aperture when the coupling is made, the inner end of the aperture being closed at the same time by the outer end portion of the male coupling member.

Another object of the invention is to prevent misalignment of the contacting portions of the two valves in such a coupling to insure proper opening thereof during connection of the coupling by providing guide members for each of the valves having substantial longitudinal surfaces slidably contacting the bores of the male and female members.

Numerous other objects and advantages will be apparent from the following description, which, when taken in connection with the accompanying drawings, discloses a preferred embodiment thereof.

Figure 1:
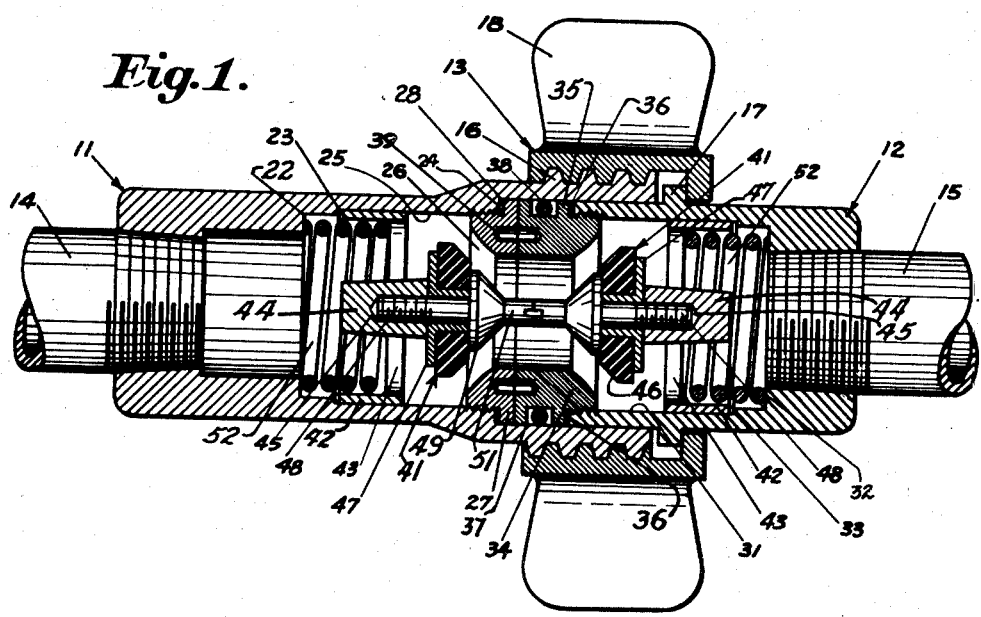
Figure 1 is a horizontal sectional view through a coupling embodying the features of the instant invention and showing the same connecting the ends of a pair of fluid conduits.
Figure 3:
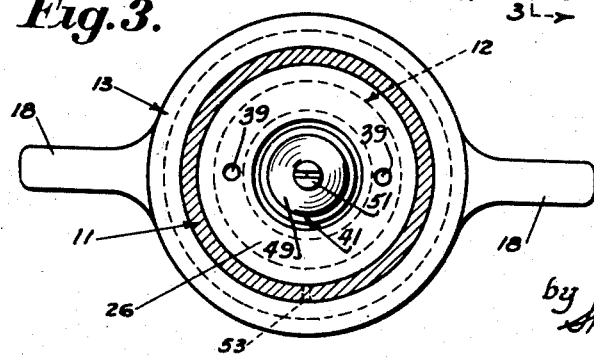
Fig. 3 is a transverse section taken substantially on the line 3—3 of Fig. 2.

Referring more particularly to the drawings, reference numeral 11 indicates in general a female member which, together with a male member 12 and cylindrical nut 13, comprises the outer portion of the coupling herein shown as illustrative of the present invention. The outer ends of each of the members 11 and 12 are adapted to be secured in any suitable manner to the ends of a pair of fluid conduits 14 and 15, such connection herein being illustrated for convenience as direct threaded engagement of the coupling members to the conduits. The inner end of the female member 11 is provided with external threads 16 for cooperation with the internal threads of the cylindrical nut 13, and the latter is provided with the usual annular flange at its other end for cooperating engagement with an annular flange 17 formed on the male member 12 intermediate its ends. It is preferred that the interengageable threads of the female member 11 and the nut 13 be of the "quick-acting" type, i. e., that they have a relatively long lead so as to enable rapid making and disconnection of the coupling. In order to further facilitate connection and disconnection of the coupling, it also is preferred that the cylindrical nut 13 be formed with a pair of outwardly extending handle portions 18, as shown in Figs. 1 and 3.

The interior of the female member 11 comprises a stepped bore forming an outer shoulder 22, an intermediate shoulder 23 and an inner shoulder 24. That portion of the bore of the female member 11 intermediate the shoulders 23 and 24 is designated by reference numeral 25 and is provided at its inner end adjacent the shoulder 24 with a suitably internally threaded portion for receiving a valve ring 26. The valve ring 26 has an outer flange 27 for maintaining sealing engagement with the inner shoulder 24 by means of a copper gasket 28 interposed therebetween. The inner end of the bore of the female member 11 extending beyond the inner shoulder 24 is designated by reference numeral 29 (Fig. 2), and is of such diameter as to slidably receive the inner end of the male member 12. The male coupling member 12 also is provided with a stepped bore, the major portion of which is indicated by reference numeral 31 and is of the same diameter as that portion of the bore of the female member 11 indicated at 25. As in the female member, the stepped bore of the male member 12 forms an outer shoulder 32 and an inner shoulder 33 corresponding, respectively, to the outer and intermediate shoulders 22 and 23 of the female member 11. The end of the bore 31 is internally threaded to receive a second valve ring 34 which is formed at its outer end with a peripheral flange 35 for sealing engagement with the inner end of the male coupling member 12 by means of a copper gasket 36 similar to the gasket 28. This peripheral flange 35 is provided with a cylindrical groove 37 for receiving a compressible or resilient gasket 38 in the form of an O ring of polymerized chloroprene, or other similar material suitably resistant to Freon or other refrigerant fluids. The outer end surfaces of each of the valve rings 26 and 34, as shown in Figs. 1 and 3, are provided with diametrically spaced recesses 39 for engagement by a spanner wrench or other suitable tool to facilitate attachment of these rings to, and detachment thereof from, their respective coupling members 11 and 12.

Figure 2:
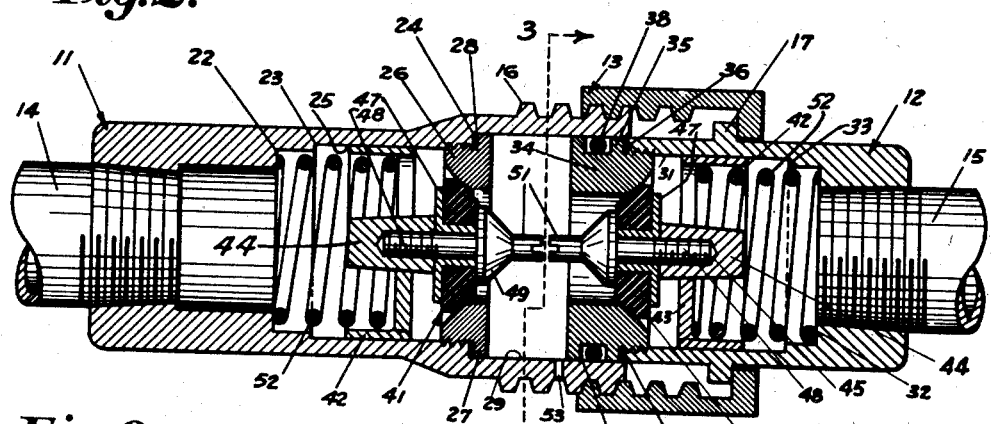
Fig. 2 is a vertical sectional view showing the coupling in the final stages of disconnection.
Figure 4:
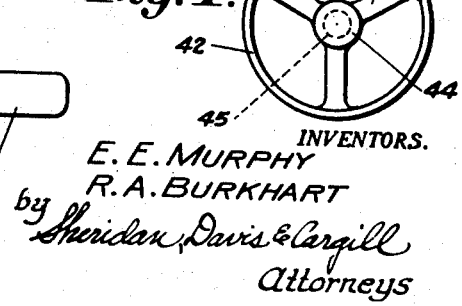
Fig. 4 is a detail end view of the guide member of one of the valve assemblies.

Slidably mounted in the bore 25 of the female coupling member 11 and the bore 31 of the male coupling member 12 are a pair of valve assemblies, indicated generally by reference numeral 41, which are identical in construction and interchangeable with each other. Each valve assembly 41 comprises a cylindrical guide or spool 42 having a substantially long outer surface for slidable engagement with either of the bores 25 or 31 so as to prevent canting, tilting or other radial misalignment of the valve assemblies with relation to their respective coupling members, and to each other, when the coupling is made. Each cylindrical guide 42, as best seen in Fig. 4, is provided with an inwardly extending web portion 43 terminating inwardly in, and formed integrally with, a central hub portion 44 having a tapped aperture 45 (Figs. 1 and 2). A movable valve 46 in the form of a resilient washer or ring of polymerized chloroprene, having a chamfered outer edge for sealing engagement with a corresponding counterbored inner surface of the associated valve ring 26 or 34, is mounted upon, and adhered to, a retaining spool washer 47 by means of a suitable Freon-resistant adhesive. This valve retaining spool washer 47 is secured to the outer end of the hub portion 44 of the guide 42 by a valve stem 48 which has an outwardly threaded inner end screwed into the tapped aperture 45 and an intermediate annular flange or shoulder 49 retentively abutting against the outer end surface of the washer 47 and the valve ring 46. The outer end of this valve stem 48 comprises an extension 51 having a tool-engageable slot in its outer end to facilitate assembly and replacement of the movable valve 46. Interposed between the web portion 43 of each guide 42 and the associated outer shoulder 22 or 23 is a suitable coil spring 52, which preferably is made of brass so as to be chemically resistant to Freon or any other refrigerant or other fluids with which it may come in contact. In this regard, all other parts of this coupling, except the copper gaskets 28 and 36, the gasket 38 and the movable valves 46, also preferably are made of brass for the same reason. As will be appreciated from Figs. 1 and 4, when the coupling is made the valve parts disposed internally thereof are so arranged and dimensioned as to provide a relatively free passage through the coupling of greater cross-sectional area at any point than that of the conduits 14 and 15 connected thereby.

As shown in Fig. 2, the inner end of the female coupling member 11 is provided with a bleeder aperture 53 extending through the side wall thereof, and through the external threads 16 thereon, into communication with the inner end 29 of the bore thereof. This bleeder aperture 53 is at a predetermined point in accordance with the position attained by the outer end of the valve ring 34 and the sealing gasket 38 in the last stages of disconnection of the coupling, after the movable valves 46 have reached closing engagement with their associated valve rings and before complete disconnection of the coupling, for reasons to be more fully explained hereafter.

The mechanism above described in detail comprises a quickly attachable and detachable coupling for connecting and disconnecting the adjacent ends of a pair of fluid conduits, which effectively prevents the loss of fluid from the conduits and seals the ends thereof automatically upon disconnection of the coupling. Since it is contemplated that this coupling be employed, amongst the other possible uses, in refrigeration systems in which a refrigerant, such as Freon, may attain pressures as high or higher than 300 lbs. per sq. in., resistance of the component parts of the coupling to any chemical action by the refrigerant and perfect sealing against leakage are additional requisites. For this reason, as previously mentioned, the several metallic parts are made of brass or copper, and the O ring gasket 38 and movable members 46 are constructed of polymerized chloroprene. To further insure against leakage, these movable valve members 46 are adhered to their supporting spool washers 47 by a suitable adhesive which likewise is resistant to any chemical action of the refrigerant. The same adhesive is employed between the contacting surfaces of the coupling member 11, the copper gasket 28 and the valve ring 26, and between the copper gasket 36 and the surfaces of the member 12 and valve ring 34 contacting therewith. As will be appreciated from an inspection of Figs. 1 and 2, the O ring gasket 38 functions to maintain an effective seal between the adjacent sliding surface of the coupling members 11 and 12 both when the coupling is made, and throughout the relative movement between these members effected during connection and disconnection thereof.

Consequently, if the coupling members 11 and 12 are separated from their completely connected position of Fig. 1 in response to disconnecting rotation of the nut 13, the gasket 38 maintains an effective seal therebetween at least until the resulting movement of the valve assemblies 41 causes sealing of the ends of the conduits 14 and 15 by engagement of the movable valve members 46 with the stationary valve members comprising the rings 26 and 34. Immediately thereafter during the last stages of disconnection of the coupling, and while the union nut 13 maintains substantial engagement with the external threads 16, the several parts will assume their positions of Fig. 2 to expose or uncover the bleeder aperture 53. Any fluid under pressure which has become entrapped in the inner end bore 29 of the coupling member 11 between the valve rings 26 and 34 during disconnection of the coupling will thus be restrictively exhausted prior to complete disconnection of the coupling. Any possible injurious results from a separating force that otherwise would be applied to the coupling members by such entrapped fluid under pressure will thus be eliminated. At the same time, when the coupling is made, the inner end of this bleeder aperture 53 is closed by the outer surface of the inner end of the male coupling member 12, and the outer end of the bleeder aperture likewise is closed by the nut 13, so that accidental introduction of any foreign material into the bleeder aperture 53, which otherwise might clog this aperture, is prevented.

During connection of the separable parts of the coupling, the extensions 51 of the valve stems 48 interengage or axially contact each other to result in translational movement of the valve assemblies 41 relative to the coupling members 11 and 12 to open the valves. Such opening of the valves results in compression of the coil springs 52. The stepped bores of the coupling members 11 and 12, however, prevent complete distortional compression of these springs and insure similar positioning of each of the movable valve assemblies 41 regardless of any differences in strength of the springs 52 due to wear, breakage, or the like. In other words, the outward opening movement of these valves is limited by the shoulders 23 and 33. Also, the length of the outer surface of the guides 42 which are in sliding engagement with the bores 25 and 31 effectively prevents misalignment of the valve stems 48 and the movable valve members 46 to insure proper opening and closing movements of the valves. It also will be appreciated that even if one or both of the springs 52 is broken, the valves will be closed by the fluid pressure in the conduits 14 and 15 during disconnection of the coupling. Positive opening of the spring-loaded valves is provided by the abutting relationship of the valve stems 48 and of the guides 42 against the shoulders 23 and 33, if one of the springs 52 is materially weaker than the other. Also, no dependence is placed upon spring-against-spring action for holding the valves 46 open equally.

The mechanism of this coupling offers a further important advantage in enabling ready removal and replacement of any of the parts thereof which may become worn during use. After disconnection of the coupling, either of the valve rings 26 or 34 may readily be removed by the application of a spanner wrench type of tool having suitable lugs adapted to engage the recesses 39. And the valve assemblies 41 similarly may readily be disassembled by an unscrewing of the valve stems 48 from the hub portions 44. It also will be appreciated that the instant coupling may, if desired, be employed to connect conduits having fluid therein under a negative or less than atmospheric pressure. Under such circumstances it is only necessary that the springs 52 be so designed as to be capable of overcoming the pressure differential existing between the atmosphere and the interior of the conduits. In such use, the bleeder aperture 53 also plays an important part by permitting the automatic introduction of the ambient air into the inner bore 29 of the female coupling member 11 after the closing of the valves to enable ready separation of the coupling members 11 and 12.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawings being merely a preferred embodiment thereof.

We claim:

1. A detachable coupling for connecting the ends of a pair of fluid conduits, comprising a female member having external threads thereon and a stepped bore forming an intermediate shoulder, the smaller diameter of said bore having a threaded portion adjacent said shoulder, a valve ring screwed into said threaded portion and having an outer flange in sealing engagement with said shoulder, a male member having one end slidably engageable in the larger diameter bore of said female member and having a stepped bore with the major portion thereof of the same diameter as said smaller diameter bore of said female member and with an internally threaded portion at the end thereof, a second valve ring screwed into said internally threaded portion and having a peripheral flange in sealing engagement with the end of said male member, said peripheral flange having an outer diameter the same as that of said male member and a circumferential groove, a gasket mounted in said groove of said second valve ring for sealing engagement with the larger diameter bore of said female member, said male member having an annular flange, a cylindrical nut for engaging said annular flange and said external threads to connect said members, and a valve slidably mounted interiorly of each of said members, said valves cooperating with each other to maintain a passage through said members of greater cross-sectional area than that of the interior of said conduits when said members are connected, and said valves engaging respectively with said valve rings in the last stages of detachment of the coupling to seal the ends of the conduits.

2. A detachable coupling according to claim 1, in which said valves are interchangeable and each comprises a cylindrical guide slidably engageable in the smaller diameter bore of said female member and having a perforated web portion and a tapped hub portion, a valve member adapted to cooperate with the associated said valve ring, and a stem removably mounted in said tapped hub portion for removably securing said valve member to said guide, the stems of said valves contacting each other to maintain said valve members out of engagement with said valve rings when the coupling is made.

3. A detachable coupling for connecting the ends of a pair of conduits for fluid under pressure, comprising a female member having external threads thereon and a stepped bore forming an inner shoulder, an intermediate shoulder and an outer shoulder, the intermediate diameter of said bore having a threaded portion adjacent said inner shoulder, a valve ring screwed into said threaded portion and having an outer flange in sealing engagement with said inner shoulder, a male member having its outer end slidably engageable in the larger diameter portion of the bore of said female member and having a stepped bore forming an inner and an outer shoulder with the major portion of said bore of the same diameter as said intermediate diameter of the bore of said female member, the bore of said male member having an internally threaded portion at the outer end thereof, a second valve ring screwed into said internally threaded portion and having a peripheral flange in sealing engagement with the end of said male member, said peripheral flange having an outer diameter the same as that of said male member and a circumferential groove, a gasket mounted in said groove of said second valve ring for sealing engagement with the larger diameter bore of said female member, said male member having an annular flange, a cylindrical nut for engaging said annular flange and said external threads to connect said members, interchangeable valve assemblies slidably mounted interiorly of each of said members, each said assembly comprising a cylindrical guide limited for outward movement, respectively, by the intermediate shoulder of the bore of said female member and the inner shoulder of the bore of said male member, each of said guides having a perforated web portion and a tapped hub portion, a replaceable valve adapted to cooperate with the associated said valve ring, and a stem removably mounted in said tapped hub portion for securing said valve to said guide, said stems contacting each other to maintain said valves out of engagement with said valve rings when the coupling is made, and a coil spring interposed between each of said valve assemblies and the adjacent said outer shoulders to assist in engaging said valves with said valve rings in the last stages of detachment of the coupling to seal the ends of the conduits, the limiting of outward movement of said guides by their associated said shoulders preventing complete distortional compression of said springs when the coupling is made.

4. A detachable coupling for connecting the ends of a pair of conduits for fluid under high pressure, comprising a male member having an exterior annular flange intermediate its ends, a female member having external threads thereon and an enlarged bore at its inner end for slidably receiving the inner end of said male member, a cylindrical nut for engaging said annular flange and said external threads to connect and detach said members, a gasket interposed between said members for sealing the coupling when made and during detachment thereof, valves mounted interiorly of each of said members which are closed in the last stages of detachment of the coupling to prevent the escape of fluid from the conduits and are opened by contact with each other during connection of the coupling, and said female member having a bleeder aperture communicating with said enlarged bore at a point so spaced from the inner end thereof as to exhaust any fluid under pressure entrapped in said enlarged bore, after closing of said valves and before complete detachment of the coupling, to prevent a separating force being applied to said members by such entrapped fluid during detachment of the coupling.

5. A detachable coupling according to claim 4, in which said gasket seals the enlarged bore of said female member against communication with said bleeder aperture during connection of the coupling before said valves are opened.

6. A detachable coupling according to claim 5, in which said bleeder aperture extends through the external threads of said female member so as to be closed at its outer end by said nut and at its inner end by said male member, when the coupling is made, to prevent clogging of said aperture by foreign matter.

7. A detachable coupling for connecting the ends of a pair of conduits for fluid under high pressure, comprising a male member attachable at its outer end to the end of one conduit and having an annular flange intermediate its ends, a circumferential groove adjacent its inner end, and a stationary valve mounted interiorly thereof; a female member attachable at its outer end to the end of the other conduit and having external threads at its inner end, a bore for slidably receiving the inner end of said male member, and a stationary valve mounted interiorly thereof; a gasket mounted in said circumferential groove for sealing engagement with the bore of said female member, a movable valve mounted interiorly of each of said members for sealing engagement with the associated said stationary valve when said members are separated to seal the ends of the conduits, a cylindrical nut for engaging said annular flange and said external threads to connect said members, said movable valves having extensions contacting each other to move said valves out of sealing engagement with said stationary valves after sealing engagement has been established between said members by said gasket during making of the coupling by said nut, and said female member having a bleeder aperture sealed from communication with the interior thereof by said gasket, when said movable valves are out of sealing engagement with said stationary valves, and communicating with the interior of the inner end portion of said member in the last stages of detachment of the coupling, after sealing engagement has been established between said movable and stationary valves, to permit any fluid under pressure entrapped in said inner end portion of said female member to be restrictively exhausted therefrom before detachment of the coupling has been completed.

8. A detachable coupling according to claim 7, in which said bleeder aperture extends through the external threads of said female member so as to be closed at its outer end by said nut and at its inner end by said male member, when the coupling is made, to prevent the introduction of foreign material thereto.

EUGENE E. MURPHY.
ROBERT A. BURKHART.

REFERENCES CITED

The following references are of record in the file of this patent:

UNITED STATES PATENTS

| Number | Name | Date |
| --- | --- | --- |
| 2,131,271 | Coles et al. | Sept. 27, 1938 |
| 2,299,193 | Trautman | Oct. 20, 1942 |
| 2,322,449 | Johnson et al. | June 22, 1943 |

Certificate of Correction

Patent No. 2,504,569                                  April 18, 1950

EUGENE E. MURPHY ET AL.

It is hereby certified that error appears in the printed specification of the above numbered patent requiring correction as follows:

Column 4, line 53, for the numeral "23" read *32*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*